United States Patent [19]

Jennings et al.

[11] 3,859,434

[45] Jan. 7, 1975

[54] MENINGOCOCCAL ANTIGENS

[75] Inventors: Harold J. Jennings, Ottawa, Ontario; Charles Paul Kenny, Hull, Quebec, both of Canada

[73] Assignee: Canadian Patents and Development Limited, Ottawa, Ontario, Canada

[22] Filed: Jan. 8, 1973

[21] Appl. No.: 322,063

[52] U.S. Cl. ............................................. 424/92
[51] Int. Cl. ............................................. C12k 5/00
[58] Field of Search ............................. 424/89, 92

[56] References Cited
UNITED STATES PATENTS
3,636,192    1/1972    Gotschlich ............................ 424/92

*Primary Examiner*—Richard L. Huff
*Attorney, Agent, or Firm*—Alan A. Thomson

[57] ABSTRACT

Cross-protective antigens are recovered from whole cells of *Neisseria meningitidis* by extraction with aqueous solutions of calcium ions at about neutral pH. Magnesium ions may be substituted for calcium in the extraction. The antigens provide active immunity to both homologous and heterologous serogroups of meningococci.

7 Claims, No Drawings

MENINGOCOCCAL ANTIGENS

This invention deals with a method of extracting cross-protective antigens from the bacterium *Neisseria meningitidis* and with the cross-protective antigen mixture so produced. The antigen mixture is immunogenic, providing protection to a broad spectrum of serogroups of *N. meningitidis*.

BACKGROUND OF THE INVENTION

The prophylaxis and treatment of meningococcal disease has been the subject of intensive recent research. Sulfadiazine-resistant strains of *Neisseria meningitidis* have evolved which contraindicate the use of this agent for prophylaxis. Many antimicrobial agents are effective in the treatment of a meningococcal infection but are unable to prevent acquisition of the disease or to eradicate the carrier state. These facts have led to a search for an immunoprophylactic system. One vaccine that has been used extensively is that of the purified, high-molecular-weight polysaccharide antigens obtained from serogroups A and C meningococci. These antigens have been proved to be immunogenic, but provide protection only to the homologous group-specific organism.

Polysaccharide antigens have been recovered from various bacteria including meningococci by a freeze-drying and multiple extraction technique (U.S. Pat. No. 2,166,963 July 25, 1939 Masucci). A lipopolysaccharide antigen has been recovered from N. meningitidis by a mild alkaline hydrolysis at pH of 9–12 (U.S. Pat. No. 3,577,527 May 4, 1971 Edwards).

SUMMARY OF THE INVENTION

We have now found that cross-protective antigens having good immunogenic activity can be obtained from whole cells of *N. meningitidis* by extraction with an aqueous solution of calcium or magnesium ions at neutral pH, and recovering the antigens from the extract. The antigens are capable of providing good immunity to challenges not only from the serogroup from which they were derived but from a wide spectrum of other serogroups.

The cells of the bacteria are harvested by any appropriate technique such as centrifuging, decanting and filtering, and then suspended in the calcium or magnesium solution, usually within a concentration range of about 50 to about 70g of wet cells (as harvested) per liter. Other cell concentrations could be used but we have found this range suitable.

The calcium or magnesium ions are usually added in the form of a soluble salt such as calcium or magnesium chloride, calcuim bromide etc. Other anions could be used if soluble to the required extent. The pH is not critical and will normally be approximately neutral. The concentration of calcium (or magnesium) ions for optimum extraction is not sharply critical and may suitably range from about 0.7 to about 1 molar calcium chloride or the equivalent in terms of concentration of calcium or magnesium ions. With lesser concentrations than stated there is insufficient extraction of the antigens whereas with greater concentrations the cells become lysed and too much extraneous matter is released. We have found about 0.9 molar calcium chloride to be very suitable.

Significant extraction of antigen will normally be obtained within about 5 to 30 minutes. However extending the time of extraction, e.g., for up to about 16 hours will increase the yields of antigen somewhat. A brief period of agitation at the end of the extraction may be carried out but is not essential. The extraction temperature is suitably about room temperature or below (e.g., down to about 0°C).

The recovery of the antigens can be carried out by removing cells and cell debris (e.g., by filtering, centrifuging, decanting etc.), removing substantially all the calcium and other inorganic ions (e.g., by dialysis, reverse osmosis, chromatography etc.), and if desired then lyophilizing the solution to give antigen solids.

The serogroup or mixture of serogroups of the cells used for extraction is not believed to be critical. Since heterologous protection has been invoked in vivo, the crossprotective antigens are believed to be common to a number of serogroups. However a greater degree of protection or still wider protection could be obtained by extracting the antigens from cells from a selected mixture of serogroups.

The following Examples are illustrative.

EXAMPLE 1

The strain of *N. meningitidis* chosen for this study was the Slaterus group Y neotype strain of the Neisseria Repository, University of California, Berkeley.

Cultivation of the organism — The medium used for the growth was Neisseria chemically defined medium (NCDM) obtained from General Biochemicals Inc., Chagrin Falls, Ohio, which was sterilized by autoclaving at 115 C for 10 min. It was then dispersed into 1-liter Erlenmeyer flasks in 300-ml amounts. Seed plates of blood-agar base medium were incubated at 37C for 24 hr. The inoculum was prepared by flooding the plates with NCDM medium and scraping the growth from the agar surface with the tip of a pipette. The resultant suspensions were pooled and homogenized by pipette trituration. Immediately before inoculation, each flask of NCDM was adjusted to pH 7.4 by the addition of 1 ml of a 5 percent sodium bicarbonate solution. Each flask was then inoculated with 0.5 ml of the cell suspension and was placed in an incubator at 37C for 18 hr. on rotary shakers which were set for 120 rotations per min. Merthiolate (trademark-sodium ethyl mercury thiosalicylate) was then added to each flask to a final concentration of 1:5,000/ml, and the flasks were incubated at room temperature until sterility was confirmed (24 hr). The contents of the flasks were then pooled in a sterile carboy; the final volume was 15 liters.

Preparation of antigens — The cells from the carboy were harvested by low-speed centrifugation (3,500 X g) to yield 20 g of wet cells. The cells were dispersed and stirred slowly in 150 ml of sterile distilled water at room temperature for 30 min; they were then recovered by centrifugation at high speed (20,000 X g) for 30 min. The recovered cells then were extracted with 0.9 M calcium chloride (350 ml, pH 7) by stirring them in the solution for 10 min. at room temperature and then more severely agitating them in an omnimixer at low speed for 25 min. at 0 C. The supernatant fluid was freed of cell debris by centrifugation at 20,000 X g for 30 min. and was dialyzed against distilled water. The dialyzed extract then was lyophylized to yield the antigenic mixture (150 mg).

EXAMPLE 2

Immunological studies — Immunodiffusion analysis was performed by the Ouchterlony method (Ouchterlony, O. 1962, Progr. Allergy 6:30-154) and microimmunoelectrophoresis was carried out by the method of Scheidegger (Scheidegger, J. J. 1955, Int. Arch. Allergy Appl. Immunol. 7:103-110.) with a barbital buffer (pH 8.6) and an applied voltage of 250 v for 45 min.

Antisera preparation — The cells of the different serogroups used were obtained from the culture collection of the Canadian Communicable Disease Center and were grown in 18-hr cultures in NCDM medium as previously described. The strains used and their corresponding serogroups were 1027-A, 2092-B, 1628-C, 158-D, Slaterus X, Slaterus Y, and Slaterus Z. The live cells of the culture were suspended in NCDM and diluted to a final count of $10^6$ cells/ml. Intravenous injections were made in New Zealand White rabbits three times a week for 3 weeks, with doses increasing from 0.25 to 2.0 ml. Exsanguination was performed 7 days after the final injection.

Agargel diffusion studies indicated that, besides giving a precipitate with the homologous serogroup antiserum, the calcium chloride extract also gave a precipitate with antisera to serogroups A, B, C, D, and Z. No cross-reaction could be detected by this technique with the antiserum to serogroup X, although the presence of a cross-protective antigen was demonstrated in an active immunization experiment (Table 1 below).

Immunoelectrophoretic analysis of the calcium chloride extract against various group-specific antisera was carried out. Four antigens were detected when the homologous serogroup antiserum was used, but a simpler pattern was obtained with the heterologous serogroup antisera. The calcium chloride extract, when run against serogroup B antiserum, produced one detectable antigen which was similar in respect to its low migratory properties to one of the antigens detected against the homologous antiserum. A similar antigen was also detected when the extract was run against serogroups D and Z antisera, although in these latter cases another common antigen was also detected. The cross-reacting antigens could not be detected by this technique when serogroup A and C antisera were used.

Evidence that this common antigen was protein in nature was provided by submitting the calcium chloride extract to trypsin and chymotrypsin digestion. The precipitate to the homologous serogroup Y antiserum was not eliminated by this treatment, probably owing to the presence of the group-specific polysaccharide antigen, whereas the precipitate against the serogroup B antiserum disappeared completely after this treatment. A similar disappearance of the precipitate formed against serogroup A antiserum was also observed.

EXAMPLE 3

The whole calcium chloride extract was used in a mouse-protection study to determine whether it could infer active immunity to a broad spectrum of serogroups of N. meningitidis. The extract was used to vaccinate mice which were subsequently challenged with live cells of serogroups A, B, X, and Y.

Mouse challenge procedures — The mice used for the challenge test were a black, $C_{57}$ BL/6-DUB strain obtained from Flow Laboratories, Rockville, Md. All the mice used were males and weighed 14 to 17 g. The vaccine was prepared by dissolving and diluting the lyophilized calcium chloride extract with phosphate-buffered saline to a concentration of 5 µg/ml. Each mouse was injected intraperitoneally with 1 ml of the vaccine (approximately 350 µg/kg.); the mice were challenged in two groups, one after 12 days and one after 18 days. The challenge suspensions of meningococci were prepared with 5 percent gastric mucin. The bacterial dilutions were prepared in NCDM, and counts were obtained with a Coulter counter (model B) by using instrument settings according to a previously described method (C. P. Kenny et al, 1967, Bull, WHO 37:569-573). The mice were injected intraperitoneally with 1 ml of a final suspension, which was comprised of 0.5 ml of 5 percent gastric mucin and 0.5 ml of the bacteria dilution. The challenge dose was 10 $LD_{100}$, which was $10^3$ cells/ml for strain 604A, $10^6$ cells/ml for strain 608B and strain 247X, and $10^7$ cells/ml for Slaterus group Y strain. The mortality rate of a group of 20 mice was nil when they were injected intraperitoneally with the mucin and medium alone.

The results of the challenge test are shown in Table 1.

TABLE 1

Per cent mortality of immunized and non-immunized mice after the challenge with strains of meningococci (10 $LD_{100}$)

| Strain of meningococcus injected | Per cent mortality of immunized mice after challenge with 10 $LD_{100}^{(c)}$ | | Per cent mortality of nonimmunized mice after challenge with 10 $LD_{100}^{(d)}$ | |
|---|---|---|---|---|
| | 12-Day challenge | 18-Day challenge | 12-Day challenge | 18-Day challenge |
| 604A[a] | 1 | 2 | 100 | 100 |
| 608B[a] | 8 | 10 | 100 | 100 |
| 247X[a] | 39 | 44 | 100 | 100 |
| Slaterus Y[b] | 5 | 0 | 95 | 100 |

[a] Virulent strain from clinical isolate.
[b] Neotype strain of group Y.
[c] Based on 100 mice for each strain.
[d] Based on 20 mice for each strain.

They indicate that extremely good protection is provided by the calcium chloride extract obtained from the cells of serogroup Y to both the homologous and heterologous serogroups. In fact, the high level of protection afforded against serogroups A and B compares well with that to the homologous serogroup Y, although the level of protection to serogroup X was somewhat lower; nevertheless, the results adequately demonstrate that the extract is still effective in providing some degree of protection. A comparison of the results obtained from the 12-day challenge and the 18-day challenge indicates that protection is maintained at a fairly constant level; however, there are indications of a slight decline in the level of protection to the heterologous serogroups.

Further tests in animals have confirmed that the antigens of this invention cause no toxic effects in guinea pigs nor pyrogenicity in rabbits at doses meeting the minimum requirements of N.I.H. recommended standards.

EXAMPLE 4

Harvested cells of *N. meningitidis* were extracted with aqueous magnesium chloride solution in the same manner as in Example 1, centrifuged, dialyzed and lyophilized as before. Cross-reaction tests as in Example 2 were repeated using this antigen mixture, and the same results were obtained as for the antigen mixture of Example 1. It is evident that the antigen mixture is substantially the same in both cases.

We claim:

1. A method of recovering cross-protective antigens from *Neisseria meningitidis* comprising:
   extracting harvested whole cells of the bacteria with an aqueous solution of calcium or magnesium ions at about neutral pH, the concentration of said ions being insufficient to cause lysis of the whole cells but sufficient to effect significant extraction of said antigens, and recovering soluble cross-protective proteinaceous antigens from the extract.

2. The method of claim 1 wherein an aqueous calcium or magnesium chloride solution is used.

3. The method of claim 2 wherein the solution concentration is about 0.7 to about 1 molar.

4. The method of claim 1 including removing solids after extraction, dialyzing the clear extract against water, and lyophilizing to recover the antigens.

5. The method of claim 1 wherein the cells are from serogroup Y.

6. A mixture of cross-protective protein-containing antigens extracted from *Neisseria meningitidis* with aqueous calcium or magnesium ion solutions according to claim 1.

7. The mixture of antigens of claim 6 derived from serogroup Y.

* * * * *